(12) United States Patent
Campbell

(10) Patent No.: US 12,721,316 B1
(45) Date of Patent: Sep. 1, 2026

(54) PLAYTIME PET SLEEVE

(71) Applicant: Andre Reveleno Campbell, Frederick, MD (US)

(72) Inventor: Andre Reveleno Campbell, Frederick, MD (US)

( * ) Notice: Subject to any disclaimer, the term of this patent is extended or adjusted under 35 U.S.C. 154(b) by 0 days.

(21) Appl. No.: 19/353,395

(22) Filed: Oct. 8, 2025

Related U.S. Application Data

(60) Provisional application No. 63/765,741, filed on Mar. 2, 2025.

(51) Int. Cl.
*A01K 15/02* (2006.01)
*A41D 13/08* (2006.01)

(52) U.S. Cl.
CPC ............ *A01K 15/026* (2013.01); *A41D 13/08* (2013.01)

(58) Field of Classification Search
CPC .............. A01K 15/026; A01K 15/0258; A01K 15/0252; A01K 15/0201; A41D 13/08
See application file for complete search history.

(56) References Cited

U.S. PATENT DOCUMENTS 5,348,510 A * 9/1994 DuPont .................. A63H 3/365 2/209.12
6,918,355 B1 * 7/2005 Arvanites ............ A01K 15/026 119/707
7,200,870 B1 * 4/2007 Kolk ...................... A41D 13/08 2/167
D552,355 S * 10/2007 Roehrig ....................... D21/659
12,588,659 B2 * 3/2026 Salyer .................. A01K 15/026
2001/0027755 A1 * 10/2001 Denesuk .............. A01K 1/0353 119/709
2007/0028345 A1 * 2/2007 McCarty ................ A41D 13/08 2/59
2018/0220724 A1 * 8/2018 Bunn ..................... A41D 19/01
2022/0361546 A1 * 11/2022 Beatty ..................... A23L 27/72

FOREIGN PATENT DOCUMENTS

CA 1222102 A * 5/1987 ............. A41D 13/08
CN 217220166 U * 8/2022
JP 2024011520 A * 1/2024
WO WO-2005099499 A1 * 10/2005 ........... A41D 31/245
WO WO-2015013308 A1 * 1/2015 ............. A23K 10/30

* cited by examiner

*Primary Examiner* — Ebony E Evans

(57) ABSTRACT

An arm sleeve designed to protect the user's hands and arms while interacting with a pet animal. A chew toy character is integrated into the distal end of the arm sleeve, allowing the user to articulate the mouth of the character with their fingers. The arm sleeve comprises a plurality of protective layers. The innermost layer surrounds the user's hand and arm. A mesh fabric surrounds the innermost layer, designed to protect the user's hand and arm from the pet's teeth and claws. A soft foam layer surrounds the mesh fabric, designed to protect the pet animal from injuring their teeth and claws on the mesh material. Lastly, the outer layer surrounds the soft foam layer. The outer layer preferably matches the plushy material of the chew toy character. A method of making the arm sleeve includes a cotton lining that can be interchangeable with the soft foam layer.

5 Claims, 14 Drawing Sheets

PLAYTIME PET SLEEVE

FIELD OF THE INVENTION

The present invention relates generally to arm sleeves. More specifically, the present invention is an arm sleeve designed to protect the user's hands and arms while interacting with a pet animal.

BACKGROUND OF THE INVENTION

Many pet owners today enjoy playing with their pets using their hands. However, pets tend to have sharp claws and teeth which can be painful for the user during playtime. For example, a user can hold a chew toy in one hand while playing with their pet. But as the pet tries to reach and bite the chew toy, oftentimes the pet will bite and claw the user's hand by mistake. This can leave visible bite marks and claw marks on the user's hand and forearm. Thus, a need exists to provide a better way for pet owners to play with their pet while protecting their hand and arm from bite and claw marks.

SUMMARY OF THE INVENTION

The present invention is an arm sleeve designed to protect the user's hands and arms while interacting with their pet animal. At the end of the arm sleeve is an integrated plushy animal head for the pet's enjoyment. The plushy animal head is attached in such a way that allows for the user's hand to go through the arm sleeve and into the plushy head to operate the head and mouth. The user can manipulate the mouth of the plushy animal head using their thumb and fingers.

To protect the user's hand and arm, the arm sleeve comprises multiple layers. The innermost layer surrounds the user's hand and arm and is preferably made from a soft fabric material such as velveteen or cotton. The next layer surrounding the innermost layers is a mesh fabric designed to protect the user's hand and arm from bite marks and claw marks. The next layer surrounding the mesh material can either be a cotton lining or a soft foam layer. This layer is designed as a soft barrier to protect the pet's claws and teeth from engaging with the mesh material.

Lastly, the outer layer surrounds the cotton lining/soft foam layer. Preferably, the outer layer is made from the same plushy material as the animal head, thereby matching the theme of the animal head. The plushy animal head can be selected from one of many animal characters including a mouse, rat, cat, dog, rabbit, and a squirrel.

The present invention can also be fitted with an elastic cuff and drawstring to ensure a snug fit to the user's arm. This prevents the arm sleeve from sliding off while playing with the pet.

The present invention also includes two methods of making the arm sleeve. The first method uses soft foam as the protective barrier, while the second method uses a cotton lining as the protective barrier.

DETAIL DESCRIPTIONS OF THE INVENTION

All illustrations of the drawings are for the purpose of describing selected versions of the present invention and are not intended to limit the scope of the present invention.

Figure 1:
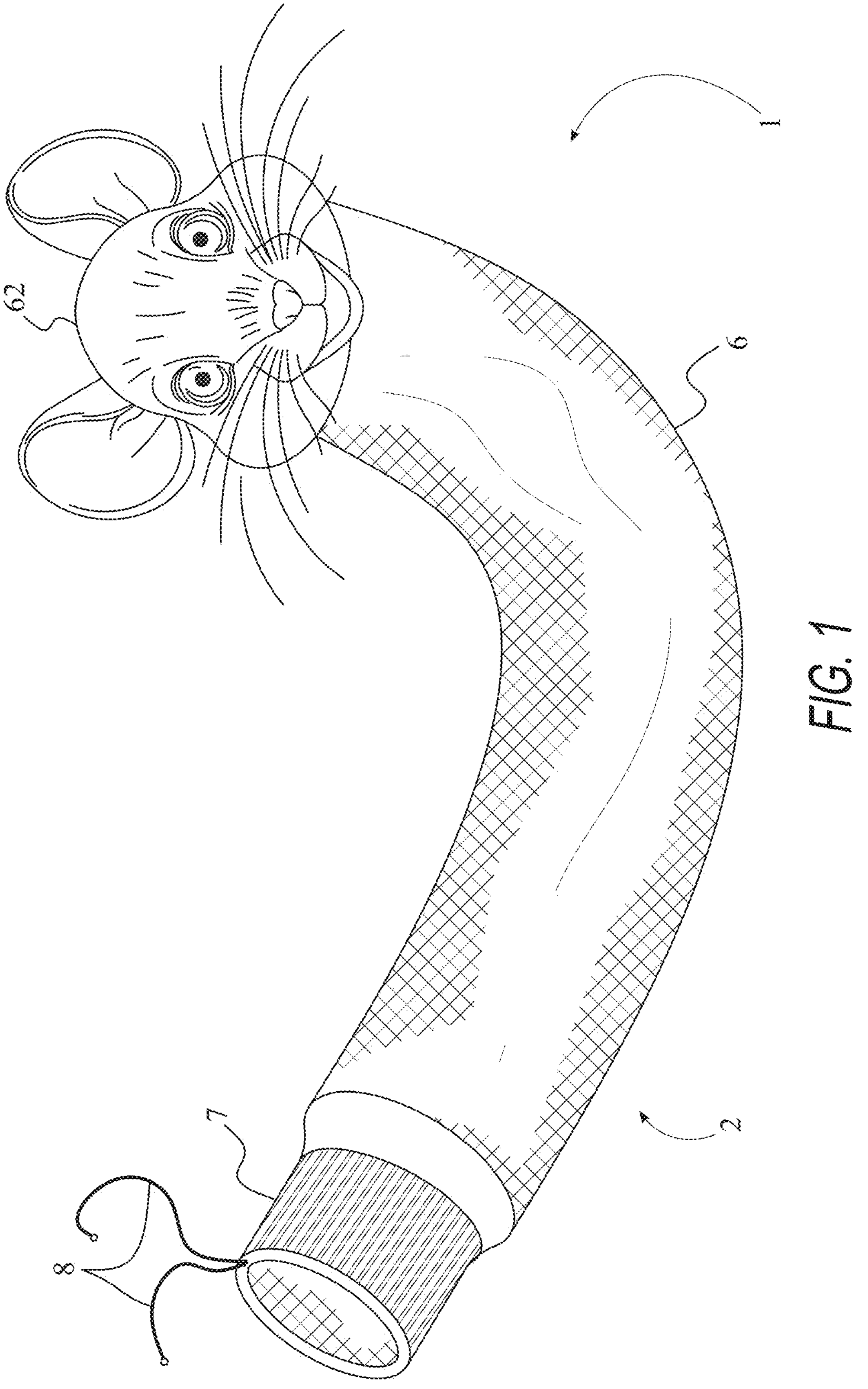
FIG. 1 is a front elevational view of the present invention, shown with a mouse toy head.
Figure 2:
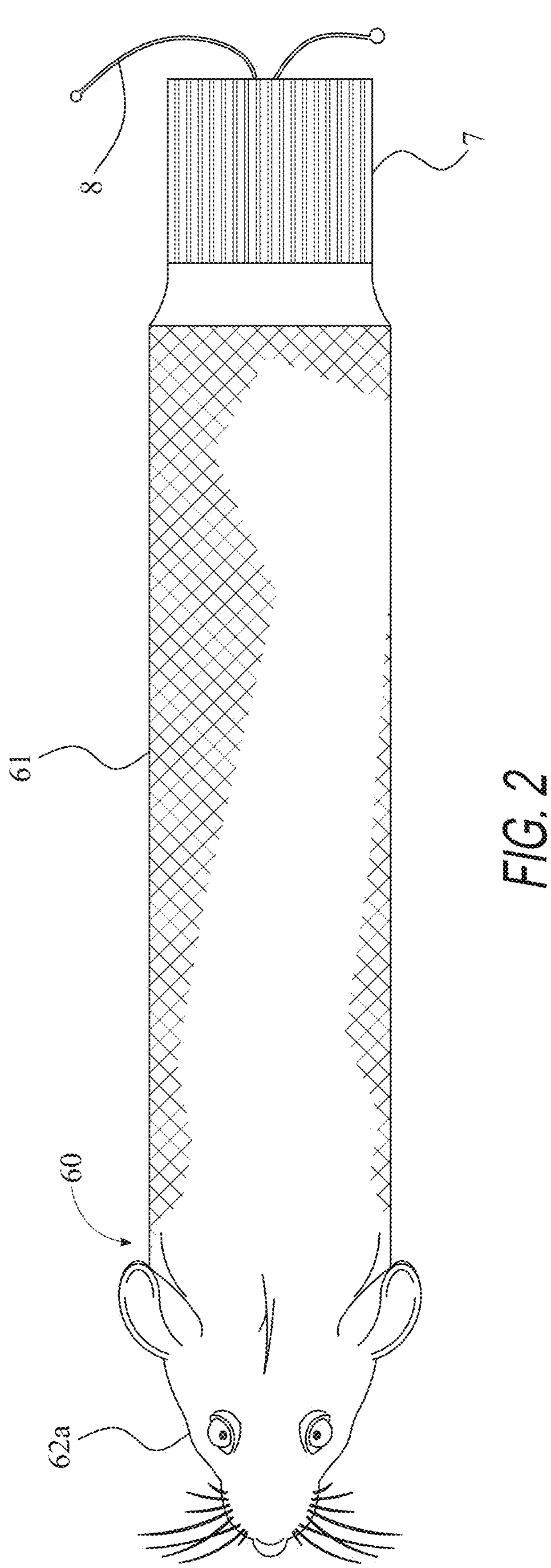
FIG. 2 is a top plan view of the present invention, shown with a mouse toy head.
Figure 3:
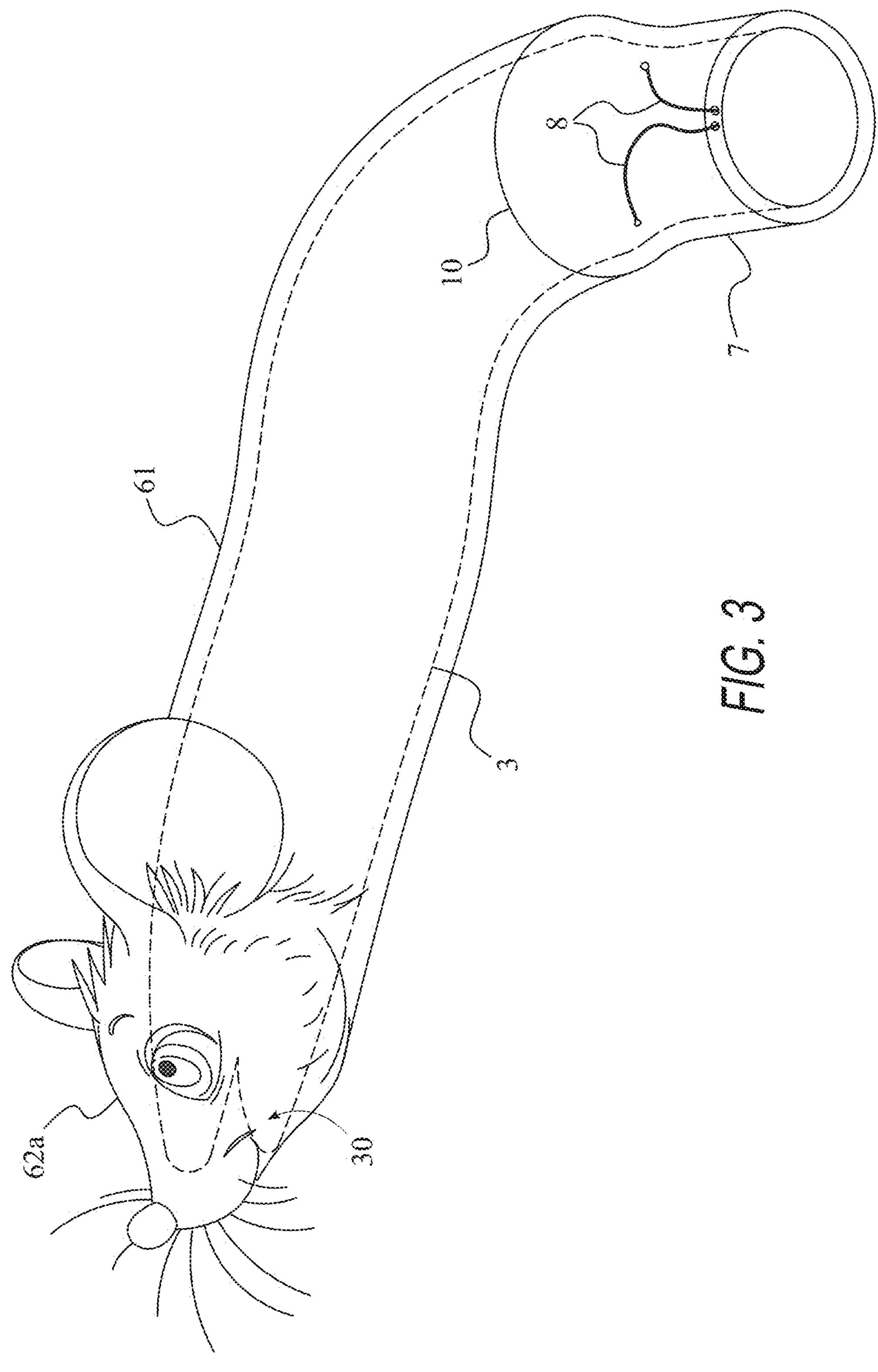
FIG. 3 is a top-front perspective view of the present invention, showing the finger placements in the mouse toy head.
Figure 4:
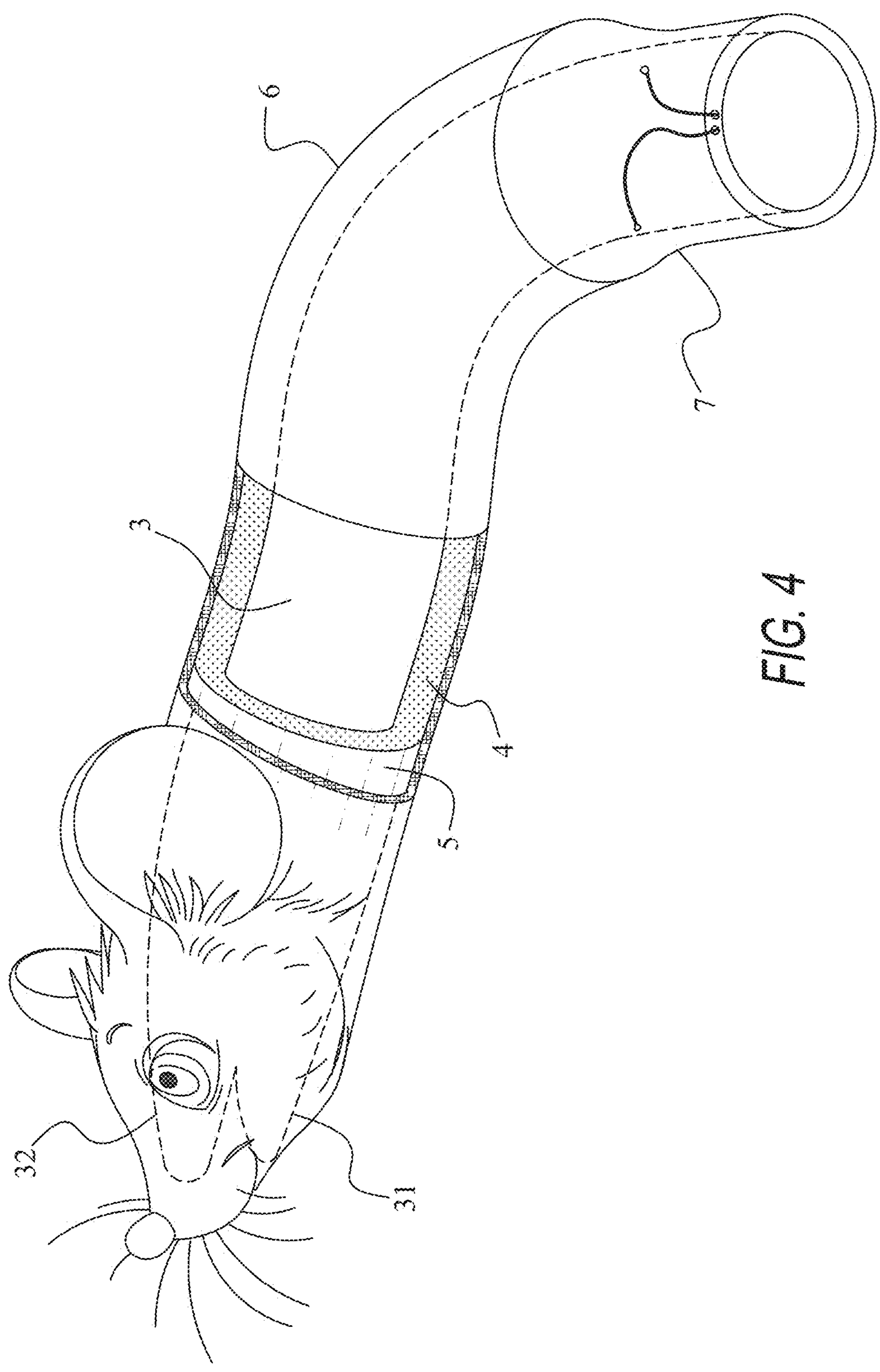
FIG. 4 is a top-front perspective view of the present invention, showing the finger placements in the toy head and the plurality of layers.
Figure 5:
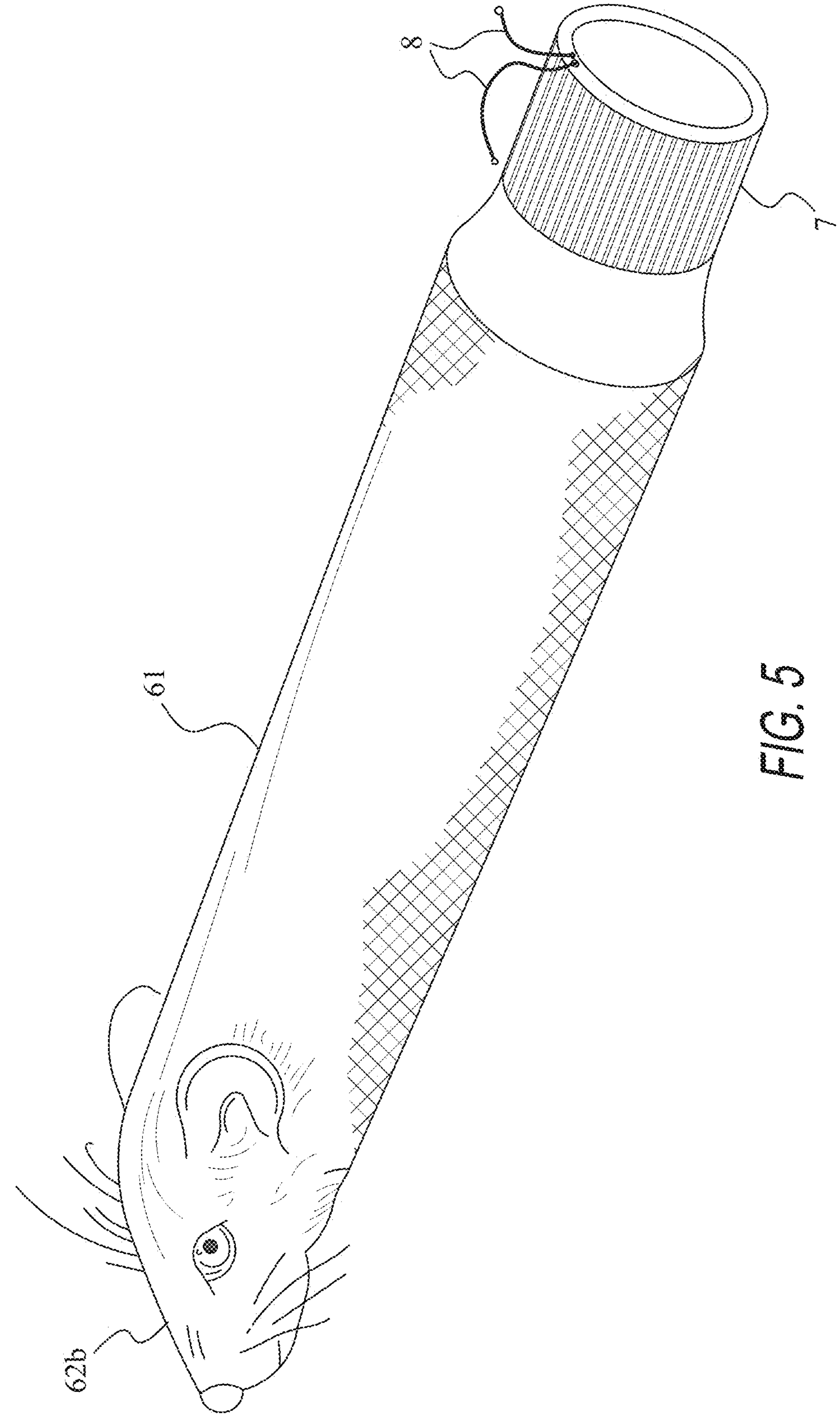
FIG. 5 is a top-front perspective view of the present invention, shown with a rat head.
Figure 6:
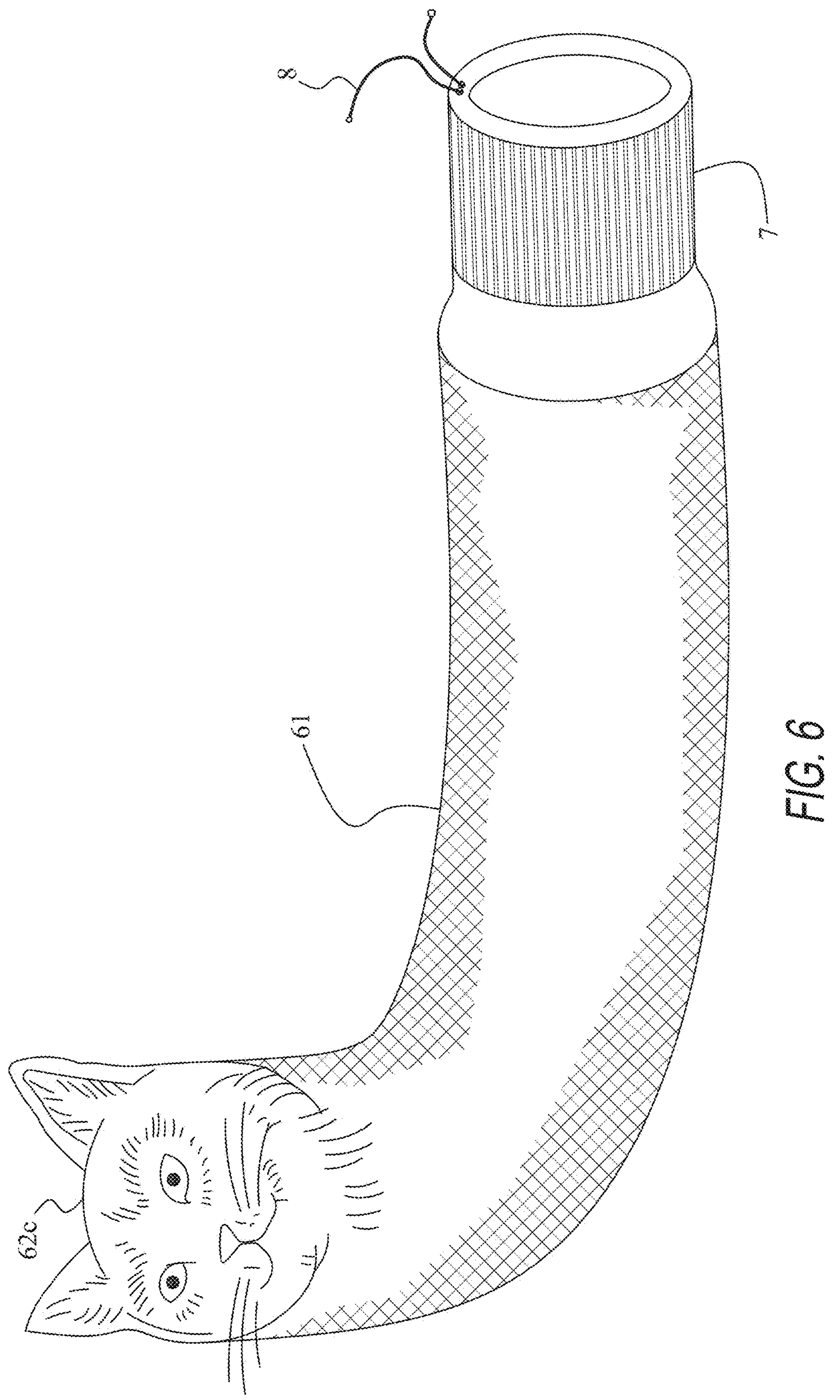
FIG. 6 is a top-front perspective view of the present invention, shown with a cat head.
Figure 7:
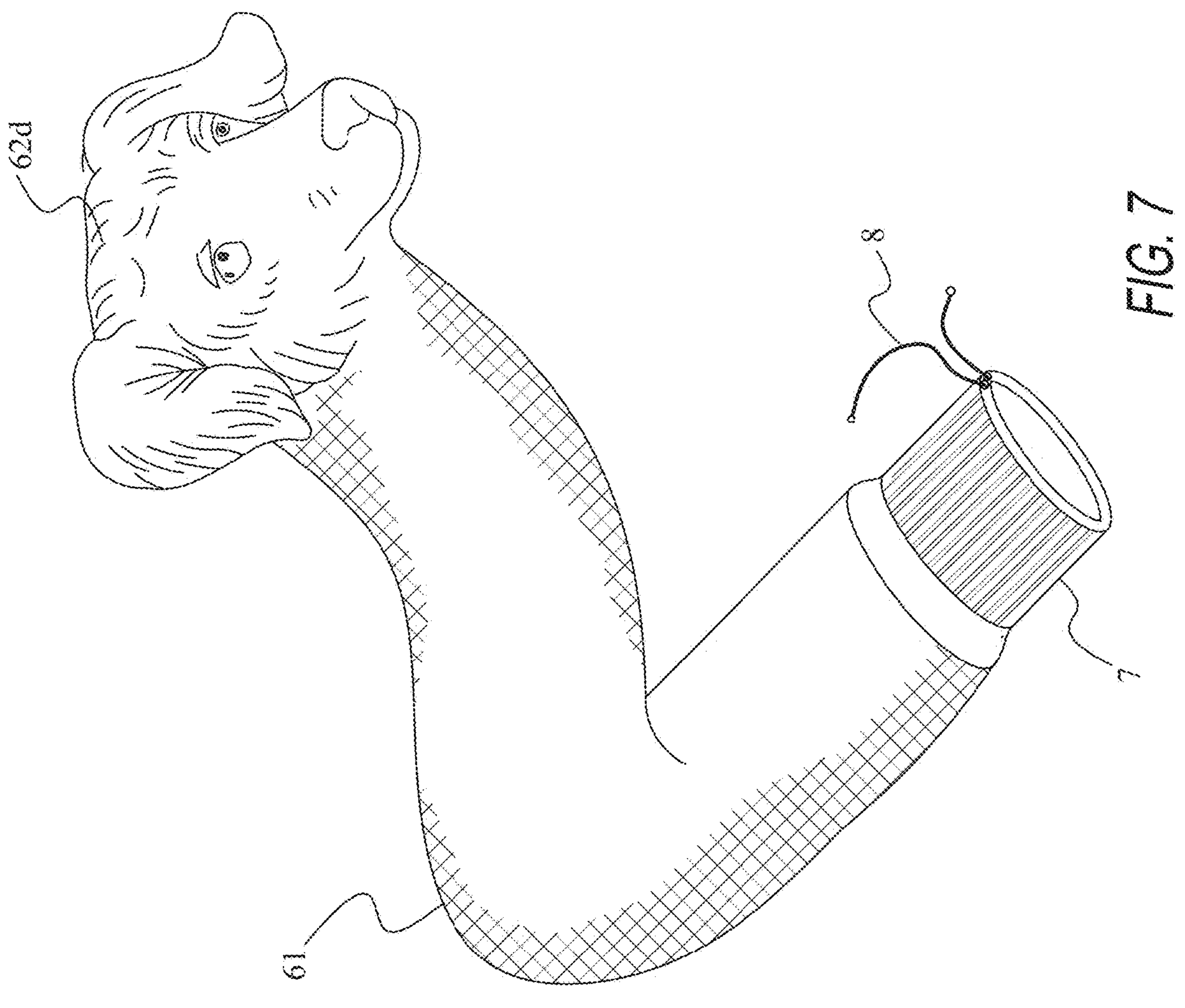
FIG. 7 is a top-front perspective view of the present invention, shown with a dog head.
Figure 8:
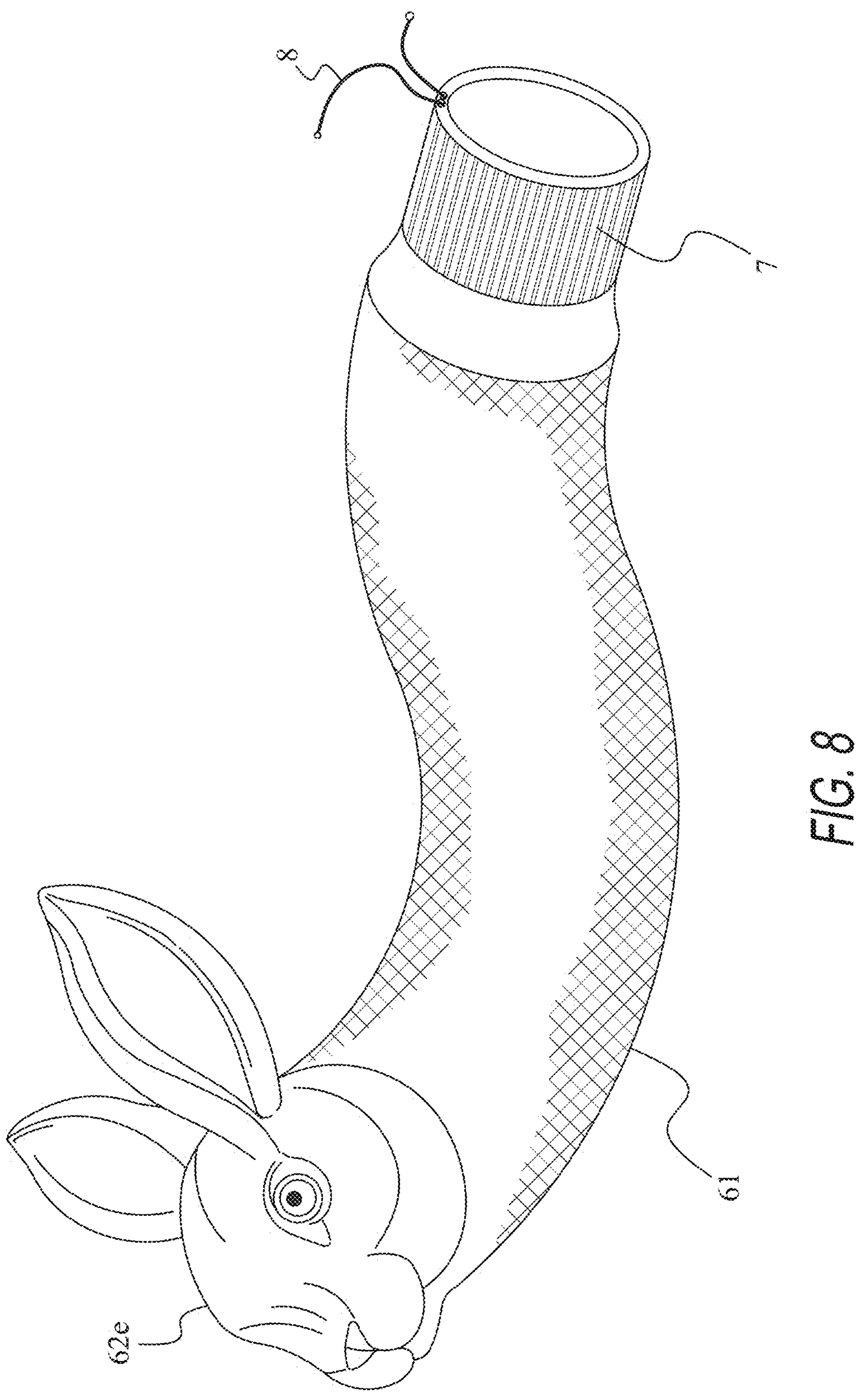
FIG. 8 is a top-front perspective view of the present invention, shown with a rabbit head.
Figure 9:
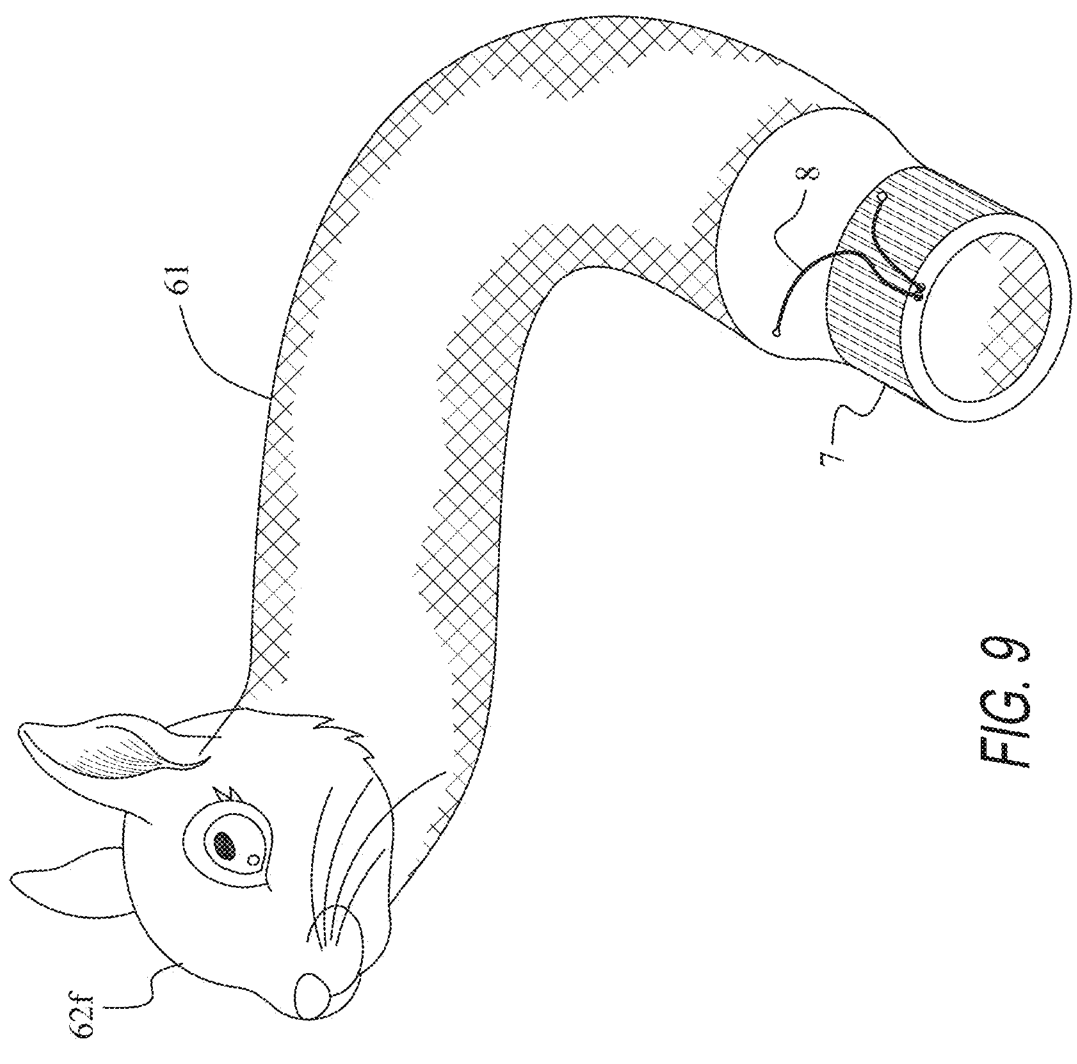
FIG. 9 is a top-front perspective view of the present invention, shown with a squirrel head.
Figure 10:
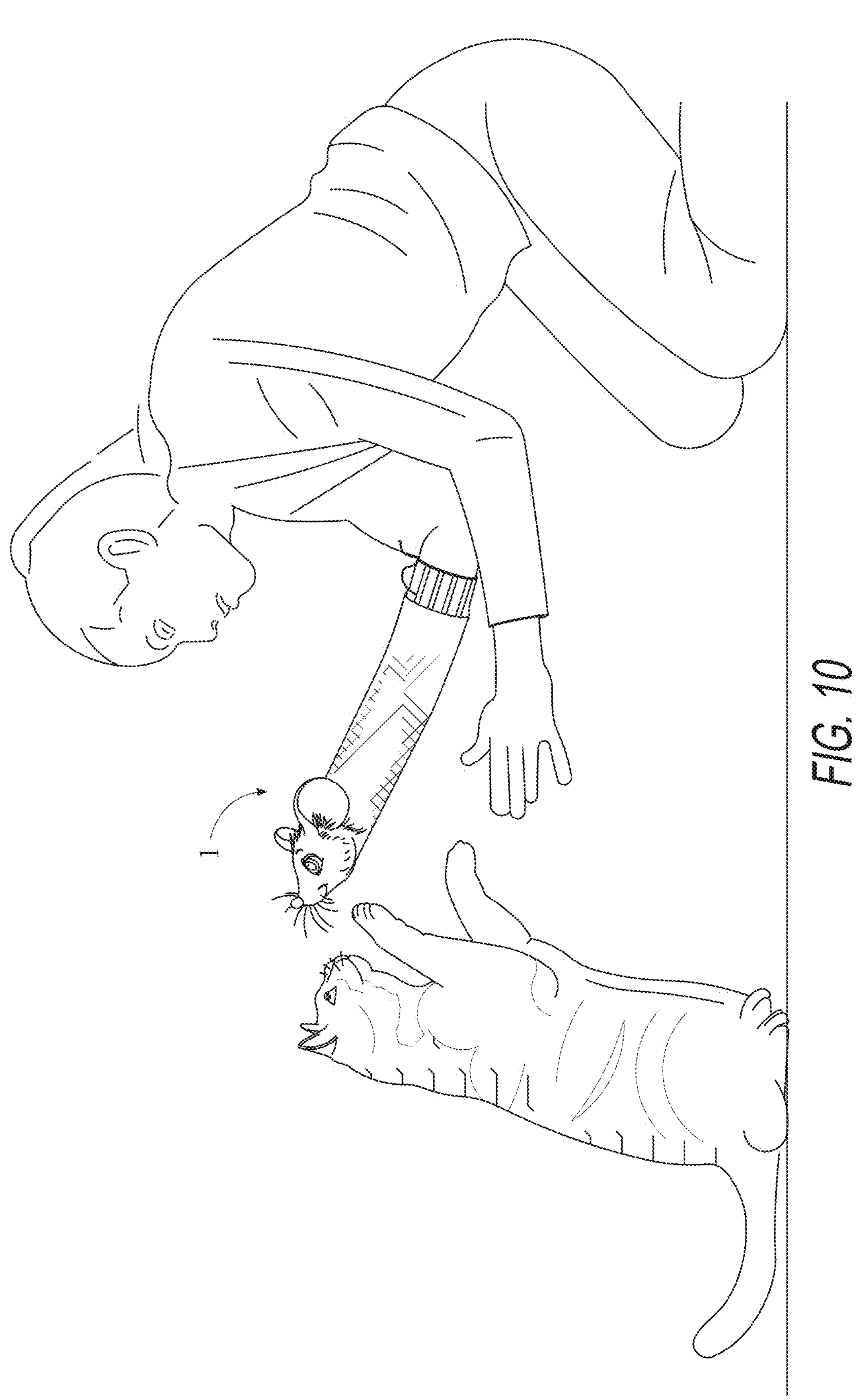
FIG. 10 is an illustration view showing the present invention in use.

As can be seen in FIGS. 1-10, the present invention is a protective arm sleeve 1 for interacting with pet animals. Thus, the present invention is multi-functional in that it protects the user's arm while playing with the pet animal and also functions as a chew toy for the pet's enjoyment. The protective arm sleeve 1 comprises a plurality of layers 2. Depending on user preference, the plurality of layers 2 can have various combinations of materials and layer arrangement. As seen in FIG. 4, the plurality of layers 2 comprises an innermost layer 3, a first internal layer 4, a second internal layer 5, and an outer layer 6.

Starting with innermost layer 3 and working outwards, the innermost layer 3 is made of a soft and stretchable fabric material that covers the user's hand and forearm. The soft fabric material of the innermost layer 3 can include but is not limited to velveteen, satin-like material, and cotton. Next, the first internal layer 4 surrounds the innermost layer 3. The first internal layer 4 is a mesh fabric material, designed to prevent the animal's teeth and claws from piercing through the innermost layer 3. The mesh fabric material of the first internal layer 4 can include but is not limited to stainless steel mesh fabric and coated mesh fabric. Thus, the first internal layer 4 serves as a protective barrier against the pet's claws and teeth from penetrating the user's skin.

To protect the pet's claws and teeth from injury caused by the steel mesh, the second internal layer 5 surrounds the first internal layer 4. Preferably, the second internal layer 5 is made from soft foam material. However, in other embodiments, the second internal layer 5 can be made of any other soft material, including but not limited to cotton.

The outer layer 6 is a soft and stretchable fabric that surrounds the second internal layer 5. The soft fabric material of the outer layer 6 can include but is not limited to velveteen, velveteen-like material, and furry fabric. The outer layer 6 comprises a tube body 61 and a toy head 62. The toy head 62 is preferably stitched onto the far end of the tube body, opposite of the arm-receiving opening. Stated another way, the toy head 62 is perimetrically connected to a distal end 60 of the tube body 61. The toy head 62 is preferably a plushy animal character with cotton stuffing. As illustrated in FIGS. 1-10, the plushy animal character can be in the form of but is not limited to a mouse 62*a*, a rat 62*b*, a cat 62*c*, a dog 62*d*, a rabbit 62*e*, and a squirrel 62*f*. It is understood that other animal characters can be implemented as well without departing from the scope of the present invention.

In the preferred embodiment, as best seen in FIG. 3, the user can articulate the toy head 62 using their fingers. To enable this function, a distal end 30 of the innermost layer 3 extends into the toy head 62. The distal end 30 comprises a first cavity 31 and a second cavity 32, wherein the first cavity 31 can be used as a thumb placement while the second cavity 32 can be used as a finger placement. In this arrangement, each of the first and second cavities 31,32 are operably connected to the toy head 62, allowing the user to articulate the toy head 62 in multiple ways using hand gestures.

In the preferred embodiment, the present invention further comprises an elastic cuff 7. The elastic cuff is 7 preferably stitched onto the arm-receiving opening, opposite of the toy head 62. Stated another way, the elastic cuff 7 is perimetrically connected along an open end 10 of the protective arm sleeve 1. Further, a drawstring 8 is integrated with and operably connected to the elastic cuff 7. This arrangement ensures a snug fit, restricting the protective arm sleeve 1 from sliding off the user's arm. In other embodiments, the present invention can be configured with the elastic cuff 7 but without the drawstring 8. In other embodiments, the present invention can be configured without the elastic cuff 7 and the drawstring 8.

Figure 11:
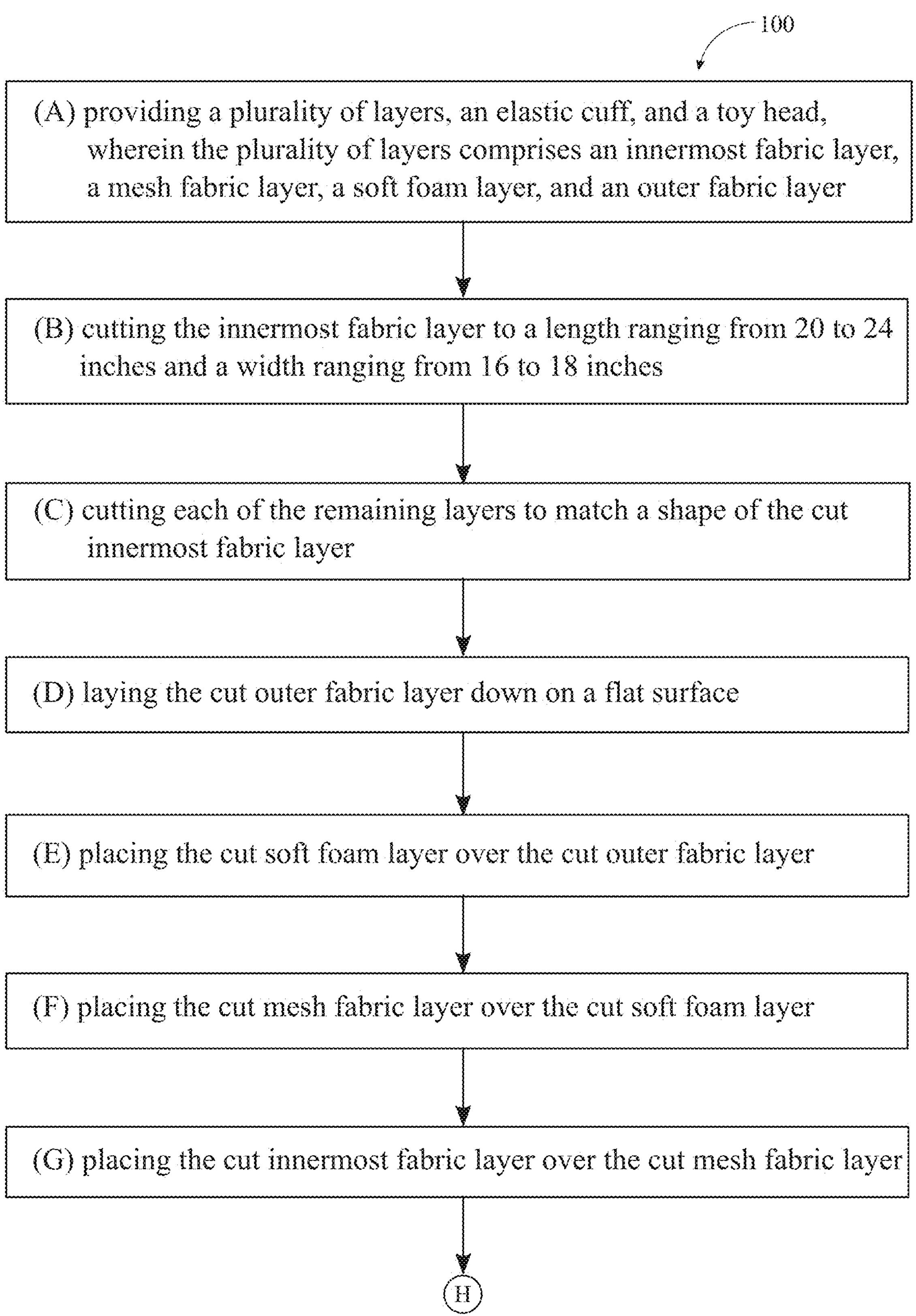
FIG. 11 is a flowchart illustrating a method of the present invention, according to a first embodiment.
Figure 12:
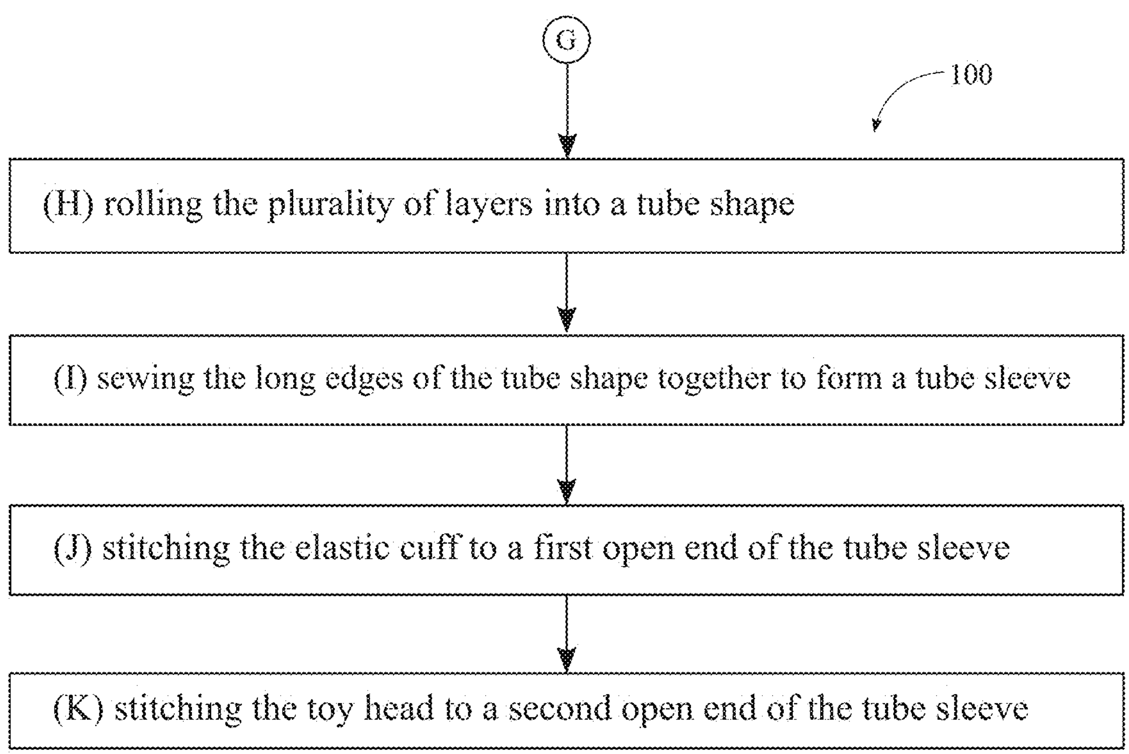
FIG. 12 is a continuing flowchart from FIG. 11.

FIGS. 11-12 illustrate the steps of a method 100 of manufacturing the protective arm sleeve using soft foam material. First, at Step A, an overall method of fabricating the protective arm sleeve comprises: providing a plurality of layers, an elastic cuff, and a toy head, wherein the plurality of layers comprises an innermost fabric layer, a mesh fabric layer, a soft foam layer, and an outer fabric layer. The innermost fabric layer can be any soft, stretchable fabric including but not limited to velveteen, satin-like material, and cotton. The mesh fabric layer can include but is not limited to stainless steel mesh or coated mesh fabric. The outer fabric layer can be any soft and stretchable fabric including but not limited to velveteen, velveteen-like material, and furry fabric.

Continuing at Step B, the overall method may include cutting the innermost fabric layer to a length ranging from 20 to 24 inches and a width ranging from 16 to 18 inches. After cutting to the desired shape, the cut innermost fabric layer can then be used as a template for cutting the remaining layers. Specifically, at Step C, the overall method may include cutting each of the remaining layers to match a shape of the cut innermost fabric layer.

Once all layers are cut, the user can then begin to form the tube shape by layering each item in reverse order. Specifically, at Step D, the overall method may include laying the cut outer fabric layer down on a flat surface, and then placing the cut soft foam layer over the cut outer fabric layer (Step E), and then placing the cut mesh fabric layer over the cut soft foam layer (Step F), and then placing the cut innermost fabric layer over the cut mesh fabric layer (Step G).

Once all layers are in place, the overall method may continue at Step H by rolling the plurality of layers into a tube shape. Next, while in the rolled position, the overall method may include sewing the long edges of the tube shape together to form a tube sleeve (Step I). Then, at Step J, the overall method may include stitching the elastic cuff to a first open end of the tube sleeve. Preferably, the elastic cuff is configured with an adjustable draw string integrated into the lining of the elastic cuff opening. This ensures a snug fit, restricting the sleeve from sliding off the user's arm. However, in other embodiments, the elastic cuff can be configured without the adjustable draw string.

Finally, at Step K, the overall method may include stitching the toy head to a second open end of the tube sleeve. This arrangement allows the user to insert their hand into the sleeve and into the head to operate the head and mouth of the toy head. Preferably, the toy head and the outer fabric layer are made of the same plushy material so that the outer fabric layer matches the theme of the toy head, with the exception of any accessories attached to the toy head such as eyes and whiskers which can be of different materials.

Figure 13:
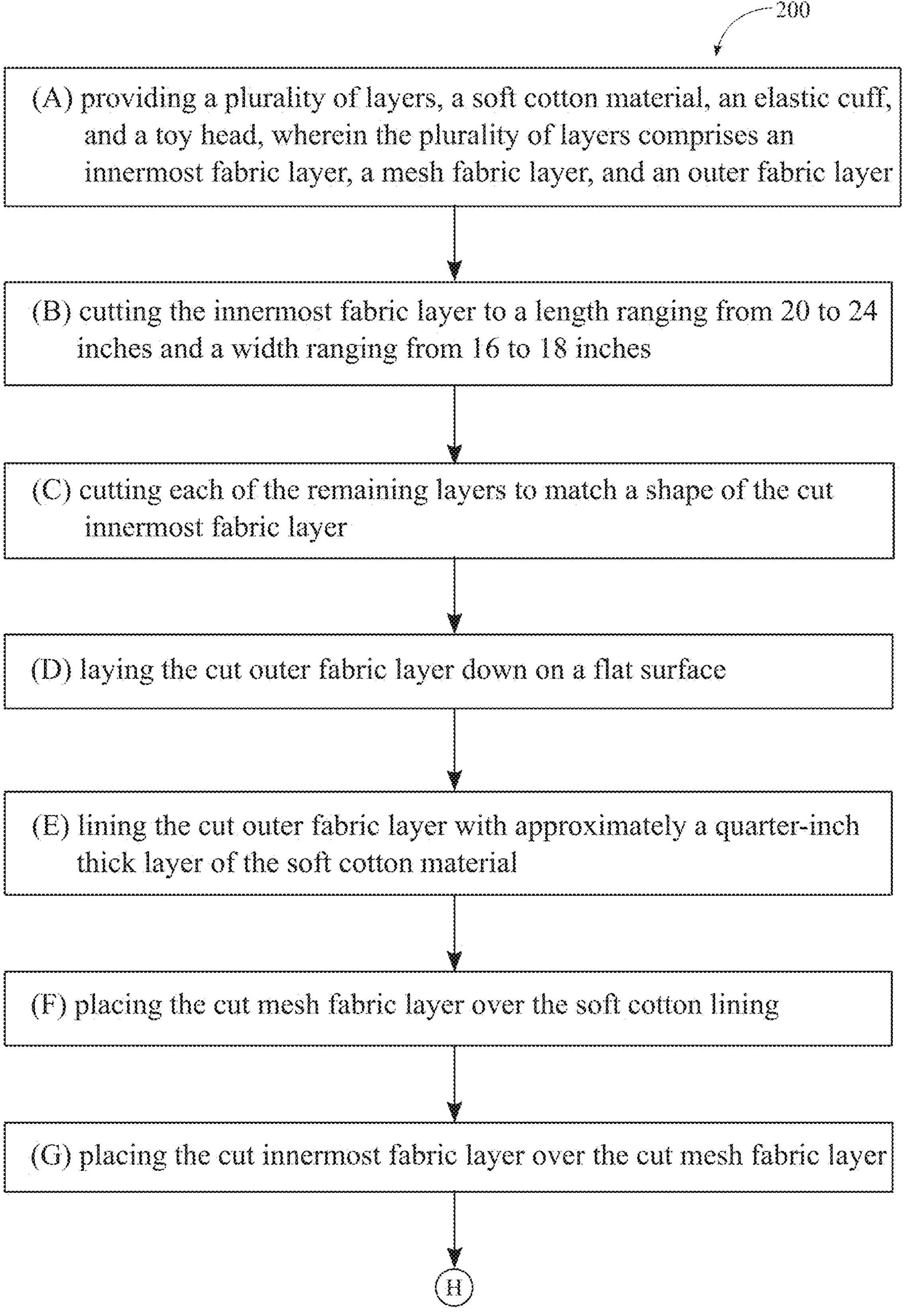
FIG. 13 is a flowchart illustrating a method of the present invention, according to a second embodiment.
Figure 14:
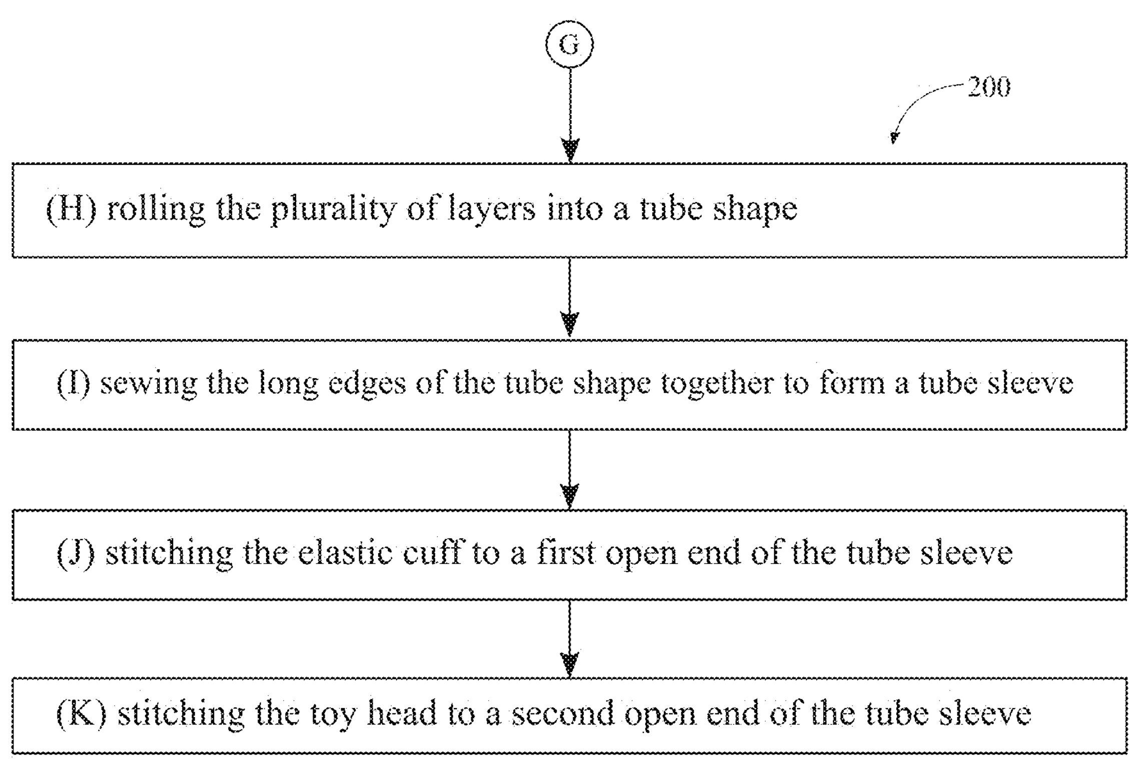
FIG. 14 is a continuing flowchart from FIG. 13.

FIGS. 13-14 illustrate the steps of another method 200 of manufacturing the protective arm sleeve using cotton lining instead of soft foam material. First, at Step A, an overall method of fabricating the protective arm sleeve comprises: providing a plurality of layers, a soft cotton material, an elastic cuff, and a toy head, wherein the plurality of layers comprises an innermost fabric layer, a mesh fabric layer, and an outer fabric layer. The innermost fabric layer can be any soft, stretchable fabric including but not limited to velveteen, satin-like material, and cotton. The mesh fabric layer can include but is not limited to stainless steel mesh or coated mesh fabric. The outer fabric layer can be any soft and stretchable fabric including but not limited to velveteen, velveteen-like material, and furry fabric.

Continuing at Step B, the overall method may include cutting the innermost fabric layer to a length ranging from 20 to 24 inches and a width ranging from 16 to 18 inches. After cutting to the desired shape, the cut innermost fabric layer can then be used as a template for cutting the remaining layers. Specifically, at Step C, the overall method may include cutting each of the remaining layers to match a shape of the cut innermost fabric layer.

Once all layers are cut, the user can then begin to form the tube shape by layering each item in reverse order. Specifically, at Step D, the overall method may include laying the cut outer fabric layer down on a flat surface, and then lining the cut outer fabric layer with approximately a quarter-inch thick layer of the soft cotton material (Step E), and then placing the cut mesh fabric layer over the soft cotton lining (Step F), and then placing the cut innermost fabric layer over the cut mesh fabric layer (Step G).

Once all layers are in place, the overall method may continue at Step H by rolling the plurality of layers into a tube shape. Next, while in the rolled position, the overall method may include sewing the long edges of the tube shape together to form a tube sleeve (Step I). Then, at Step J, the overall method may include stitching the elastic cuff to a first open end of the tube sleeve. Preferably, the elastic cuff is configured with an adjustable draw string integrated into the lining of elastic cuff opening. This ensures a snug fit, restricting the sleeve from sliding off the user's arm. However, in other embodiments, the elastic cuff can be configured without an adjustable drawstring.

Finally, at Step K, the overall method may include stitching the toy head to a second open end of the tube sleeve. This arrangement allows the user to insert their hand into the sleeve and into the head to operate the head and mouth of the toy head. Preferably, the toy head and the outer fabric layer are made of the same plushy material so that the outer fabric layer matches the theme of the toy head, with the exception of any accessories attached to the toy head such as eyes and whiskers which can be of different materials.

Although the invention has been explained in relation to its preferred embodiment, it is to be understood that many other possible modifications and variations can be made without departing from the spirit and scope of the invention.

What is claimed is:

1. A method of manufacturing a protective arm sleeve, the method comprising the steps:

(A) providing a plurality of layers, an elastic cuff, and a toy head, wherein the plurality of layers comprises an innermost fabric layer, a mesh fabric layer, a soft foam layer, and an outer fabric layer;

(B) cutting the innermost fabric layer to a length ranging from 20 to 24 inches and a width ranging from 16 to 18 inches;

(C) cutting each of the remaining layers to match a shape of the cut innermost fabric layer;

(D) laying the cut outer fabric layer down on a flat surface;

(E) placing the cut soft foam layer over the cut outer fabric layer;

(F) placing the cut mesh fabric layer over the cut soft foam layer;

(G) placing the cut innermost fabric layer over the cut mesh fabric layer;

(H) rolling the plurality of layers into a tube shape;

(I) sewing the long edges of the tube shape together to form a tube sleeve;

(J) stitching the elastic cuff to a first open end of the tube sleeve; and (K) stitching the toy head to a second open end of the tube sleeve.

2. The method as claimed in claim 1 comprising:

the toy head being in the form of an animal character; and the animal character being selected from the group consisting of a mouse, a rat, a cat, a dog, a rabbit, and a squirrel.

3. The method as claimed in claim 2, wherein the toy head and the outer fabric layer are made of the same material.

4. The method as claimed in claim 1 comprising:

the innermost fabric layer being a stretchable fabric selected from the group consisting of velveteen and cotton;

the mesh fabric layer being selected from the group consisting of stainless-steel mesh and coated mesh; and the outer fabric layer being a stretchable fabric selected from the group consisting of velveteen and furry fabric.

5. The method as claimed in claim 1 comprising:

providing a drawstring; and the drawstring being integrated with the elastic cuff.

* * * * *